(No Model.)
T. C. DALTON.
COMPRESSION STOP AND WASTE COCK.
No. 504,865. Patented Sept. 12, 1893.
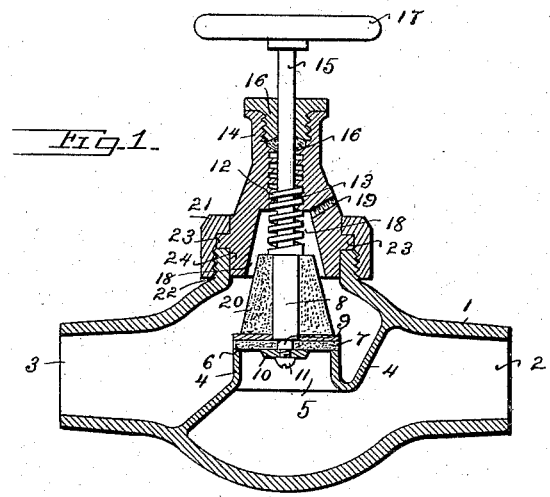
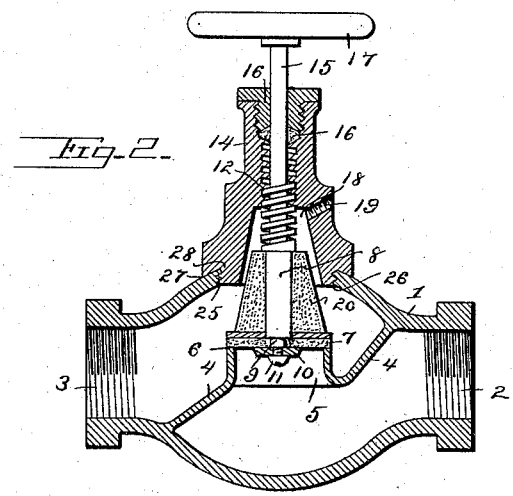
Witnesses:
Jesse B. Heller.
Aly. Scott
Inventor.
T. C. Dalton
by Lloyd Wiegand
Attorney.

UNITED STATES PATENT OFFICE.

THOMAS C. DALTON, OF PHILADELPHIA, PENNSYLVANIA.

COMPRESSION STOP AND WASTE COCK.

SPECIFICATION forming part of Letters Patent No. 504,865, dated September 12, 1893.

Application filed May 20, 1891. Serial No. 393,493. (No model.)

*To all whom it may concern:*

Be it known that I, THOMAS C. DALTON, a citizen of the United States, residing at Philadelphia, in the county of Philadelphia and State of Pennsylvania, have invented certain new and useful Improvements in Compression Stop and Waste Cocks; and I do hereby declare the following to be a sufficiently full, clear, and exact description thereof as to enable others skilled in the art to make and use the said invention.

This invention relates to waste stop cocks of the kind known as stop and waste cocks or cocks which, when closed from the source of supply, open a discharging aperture to empty the pipe beyond the stop cock. In the use of plug cocks for this service, it is found that the corrosion of the exposed finished working surfaces of the plug, occurs while the cock remains in one adjustment and the incrusting of impurities of the water upon such surfaces, causes a projection which, when the cock is turned, strains and impairs the form of the body of the stop cock and leakage ensues, which can only be remedied by cleaning and refitting or grinding the parts into fluid tight fitting with each other.

The object of this invention is to avoid the leakage incident to the use of plug cocks for this purpose and provide a cock easily repaired in its wearing parts at slight cost and without necessitating the removal of the cock from the connected pipes.

The nature of this invention to effect these desiderata, consists in an improved construction of compression cock, provided with a lateral vent in the upper part or bonnet and a plug of conical form on the upper side of the valve disk or plug and operated by the same screw, so as to close the chamber or conical seat leading to the lateral orifice when the cock is fully opened for the flow of fluid through it and to open said cavity and orifice when the cock is closed.

The construction and operation of this invention are fully hereinafter described and shown in the accompanying drawings, in which—

Figure 1 shows a lengthwise section of a stop and waste cock embodying this invention, and Fig. 2, a similar section of a modified form thereof.

Referring to the drawings, 1 represents the body of a stop cock or valve, 2 the inlet thereof, 3 the outlet, 4 the partition between the inlet and outlet, 5 the valve opening, 6 the valve-seat preferably raised above the partition 4.

7 is the valve disk, of compressible material fitted upon the valve stem 8 against a shoulder 9 and held in position thereto by a washer 10 and screw 11.

Upon the valve stem 8 is formed a screw thread 12, which fits in the nut 13, formed in the bonnet 14 of the cock or valve. The upper part 15 of the stem 8 is cylindric and fits and turns fluid tight through the stuffing box 16 and is provided with a handle 17 at the upper end by which it may be turned. A conical chamber 18 is formed in the lower end of the bonnet 14, from which an orifice 19 leads laterally outward, through which fluid from the delivery end 3 of the cock may flow. A conical plug 20 of compressible material is formed or fastened upon the valve stem above the valve disk 7, which fits the conical chamber 18 and closes the aperture 19, when the valve stem 8 is raised. The aperture or orifice 19 is preferably screw-threaded, so as to facilitate the attachment of a tube to conduct the water discharged. When the valve 7 is closed on the seat 6, the aperture 19 is opened. When it is opened the plug 20, fitting in the conical chamber 18, closes the opening 19.

In the form of the invention shown in Fig. 1, the bonnet 14 is secured to the valve body 1 by a cap nut 21, fitting upon a male screw thread 22 formed on the valve body 1 and upon a flange 23 formed on the bonnet 14. A rim 24, on the lower end of the bonnet 14, enters the valve body 1 and serves to center the parts with each other. This arrangement permits of turning the bonnet 14 so as to present the discharge aperture 19 in any direction desired.

In the form shown in Fig. 2, the bonnet 14 is secured to the body 1, by a male screw thread 25 formed on the lower end of the bonnet 14, screwed into a corresponding female screw thread 26 formed in the body 1 of the cock and changes in the direction of the aperture 19, in the bonnet 14, may be made by introducing washers 27 of varying thicknesses between the rim 28 and the surface of the cock-body 1 opposed thereto.

The packings 7 and 20 of this cock may be renewed easily without severing the cock from the pipe and are not liable to become impaired by incrustation and the cock is susceptible of easy adjustment to discharge the waste water in any required direction.

Having described my invention, what I claim is—

In a compression stop and waste cock a partitioned cock body 1 having an aperture in the partition and a raised valve seat 6, surrounding the aperture, a bonnet 14 having a conical seat 18 formed therein in axial line with the seat 6 and a female screw and stuffing box in the same axial line and a vent or branch aperture 19 in the conical seat, in combination with the screw threaded valve stem 15 arranged to work in the screw threaded bonnet 14, a compressible plug 20 fitting in the seat 18 a washer supporting said plug 20 and a compressible packing 7, adapted to cover and close the aperture in the seat 6 and the washer 10 and the screw 11 arranged to hold the packing 7 against the shoulder 9 as shown and described.

THOMAS C. DALTON.

Witnesses:
J. DANIEL EBY,
ALEX. H. SIEGEL.